United States Patent
Clarke

[11] 3,804,485
[45] Apr. 16, 1974

[54] APPARATUS USED IN THE TRACKING OF OBJECTS

[75] Inventor: Graham Morley Clarke, Edinburgh, Scotland

[73] Assignee: Ferranti Limited, Lancashire, England

[22] Filed: Oct. 25, 1972

[21] Appl. No.: 300,567

[30] Foreign Application Priority Data
Oct. 27, 1971  Great Britain .................. 49884/71

[52] U.S. Cl. ...................... 350/7, 178/7.6, 350/285
[51] Int. Cl. ........................................... G02b 17/00
[58] Field of Search ........ 350/6, 7, 285; 250/203 R; 178/7.6

[56] References Cited
UNITED STATES PATENTS

| | | | |
|---|---|---|---|
| 2,543,463 | 2/1951 | Malm | 350/6 UX |
| 3,315,563 | 4/1967 | Harper et al. | 350/285 |
| 3,436,546 | 4/1969 | Derderian et al. | 350/7 X |
| 3,617,106 | 11/1971 | Bjork | 350/7 |

*Primary Examiner*—Ronald L. Wibert
*Assistant Examiner*—F. L. Evans
*Attorney, Agent, or Firm*—Cameron, Kerkam, Sutton, Stowell & Stowell

[57] ABSTRACT

Apparatus for tracking an object within a plane area in space comprises means for scanning the area in non-parallel directions with flat beams of optical radiation and detecting radiation reflected from any object in the plane. A single flat beam is produced by causing a near-parallel beam of radiation from a laser to diverge in one plane only towards a rotatable multifaceted drum. Parts of each facet are reflective of the radiation and rotation of the drum causes the beam to scan the plane area; the remainder of each facet is transmissive of the radiation and permits the beam transmitted to be diverted towards a further multifaceted drum on which a reflective part of a facet thereof is in the path of the diverted beam and causes the beam to scan the plane area in a different direction.

11 Claims, 10 Drawing Figures

APPARATUS USED IN THE TRACKING OF OBJECTS

This invention relates to the tracking of objects within a given region of space and specifically to the tracking of objects within a plane area in that region.

A method commonly employed to keep a continuous check on an object within a defined area is to "illuminate" the area with a beam of radiation, focussed in some manner and moved over the area repetitively; detection equipment, receives radiation reflected from the object and the position of the object is determined from the known movement of the beam.

To detect objects which are small with respect to the defined area, it is desirable to have a narrowly focussed beam passing over the object. This is usually achieved by a focussing system in combination with radiation of the highest possible frequency. The combination makes attractive the use of electromagnetic radiation of about the visible frequencies. For convenience such radiation will hereinafter be called "optical radiation" or "light" and includes both infra-red and ultra violet radiation. Usual sources of optical radiation have a very broad band-spread so that receiving apparatus utilizing a small part of the band is restricted to receive radiation of low intensity. For practical use, the beam has to be focussed by an optical system to a spot in the plane of the area and that spot scanned over the area in a raster. If the area has to be scanned in a short time then severe limits are placed on the scanning arrangements.

It is an object of this invention to provide simplified apparatus for tracking an object within a plane area of space.

According to the present invention apparatus for tracking an object within a plane area in space comprises a source of optical radiation, an optical system arranged to form the radiation from the source into a flat beam, movable reflector means arranged to divert the path of the beam and to cause the diverted beam to scan the plane area in at least two non-parallel directions, each scan being transverse to the direction of greatest divergence of the beam, and a receiver system responsive to the irradiation of the object by the beam to determine the position of the object in said plane.

The source of radiation is preferably a laser.

In this specification the term "flat beam" is used to denote a beam which undergoes substantial divergence in one plane only, which plane is perpendicular to the direction of propagation of the beam.

The present invention will now be described by way of example with reference to the accompanying drawings, in which:

FIG. 1 is a perspective view of the optical arrangement of the tracking system,

FIGS. 2(a), 2(b) and 2(c) show alternative scanning arrangements,

Figure 1:
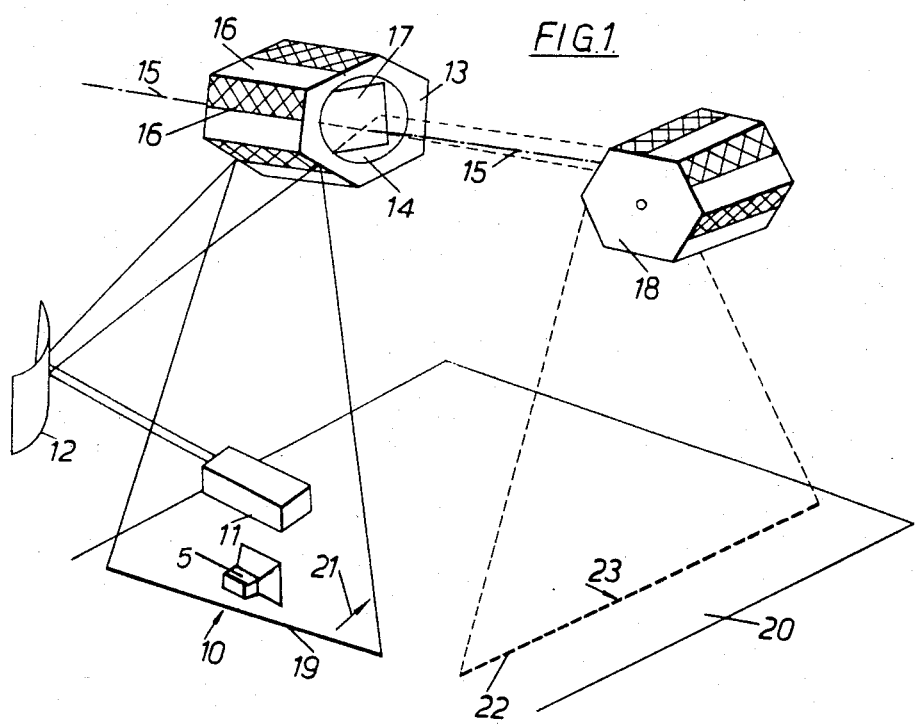

Referring to FIG. 1, the apparatus 10 includes a laser 11, comprising a source of optical radiation, capable of emitting radiation continuously in the visible part of the spectrum and arranged so that the light, emitted in a narrow parallel sided beam, is caused to diverge by an optical system comprising a cylindrical mirror 12. The mirror 12 is positioned such that the beam is reflected from its convex surface and is caused to diverge in the horizontal plane but not in the vertical plane.

A drum 13 of transparent material has a regular hexagonal overall section and a central cavity 14 of circular cross-section extending along its longitudinal axis 15. Each of the six longitudinal facets 16 is silvered over half its width so that there are six reflecting and six transmitting areas alternating around the surface of the drum. Alternatively alternate facets of the drum only may be silvered over the whole facet.

The drum 13 is mounted with its longitudinal axis 15 horizontal, and perpendicular to the direction of propagation of the diverging beam, so that in operation, the diverging beam strikes a reflecting or transmitting part of one facet. When the beam strikes a transmitting part of the drum wall it passes through to the central cavity 14 where a plane mirror 17 diverts the beam into a direction essentially parallel to the drum axis and out of the end of the drum. A second drum 18, similar to the drum 13 but having no central cavity is mounted on an axis that is horizontal but perpendicular to the axis 15 and such that the diverted beam is intercepted by one of the facets of the drum 18. The drums 13 and 18 and the plane mirror 17 comprise movable reflector means.

In operation the drums 13 and 18 are arranged to rotate about their axes in synchronism at a constant speed. Upon being interrupted by a part of a reflecting facet 16 of the drum 13, the beam is diverted at an angle to the horizontal so that it is intercepted by a plane 20 below the drums, as indicated at 19. As the drum 13 rotates the angle of incidence between the beam and the reflecting facet increases continuously thereby causing the beam to scan over the plane in the direction shown by the arrow 21, that is, transversely to the greatest dimension of the beam.

It will be appreciated that as the narrow beam from the laser is not focussed to produce the flat beam it is "in focus" at any plane, that is, the beam has an infinite depth of focus. The only parameter varying with distances is the width of the beam in one direction.

After the beam has been reflected and scanned by the drum 13, a transmitting part of the next facet of that drum interrupts the beam; the beam passes through the transparent wall of the drum and is diverted by the mirror 17 towards the drum 18. The synchronism between the drums ensures that at this time a reflecting part of a facet on the drum 18 is just beginning to intercept the diverted beam. The beam is again reflected at the surface into a downward direction and orthogonal to the first beam and is intercepted by the plane 20, as indicated at 22. The rotation of the drum causes this second beam to scan across the plane in a direction transversely to its greatest dimension and perpendicular to the first scan, in the direction of the arrow 23. Thus as both drums rotate, the plane 20 is scanned by the two images 19 and 22 in perpendicular directions alternately.

Light incident upon any object with the area scanned by the beams is reflected in all directions. Receiving apparatus, for example, a photomultiplier and detector 5, conveniently placed near the laser source detects when an object has been crossed by a beam, and by relating the time into the scan that the crossing occurs with the time into the orthogonal scan that crossing also occurs the position of the object within the scanned area may be accurately determined. As pointed out above, the beam has an infinite depth of focus so that all objects within the scanned area are detected equally, irrespective of their distance from the rotating drums.

By well known optical principles, the angle of scan is twice the angle through which the drum moves to bring the next facet into the beam; for an n-facet drum having fully reflecting facets this would be $2 \times 360°/n$. In this case, only half of each facet reflects thereby reducing the scan angle to $360°/n$. The two drums 13 and 18 are arranged to have the number of facets that will give a scan angle required to cover the area of interest. The number of facets need not be the same on each drum, for example, if the area to be scanned is rectangular; in such a case synchronisation is maintained by rotating the drums at speeds in the ratio of the number of facets on the drums.

Although a relatively low-powered laser is capable of producing an intense beam of very small cross sectional area, this advantage is soon lost if the beam is caused to diverge widely. In the present invention, the laser beam is necessarily caused to diverge in one direction as well as undergo a series of reflections before it reaches the receiving apparatus. The intensity of the detected light is therefore extremely low, but several modifications may be made to reduce the possibility of a false signal.

Figure 2A:
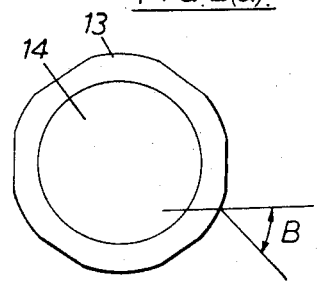
Figure 2C:
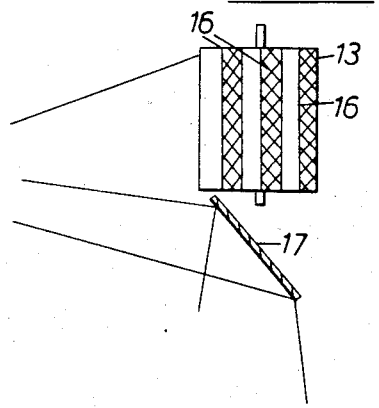
Figure 2B:
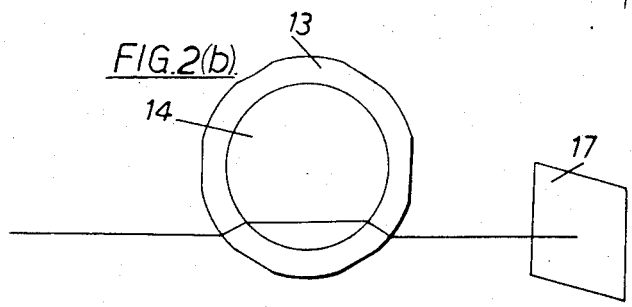

The beam passing through the transmitting part of a facet 16 is refracted at both surfaces and through a changing angle as the drum 13 rotates thereby striking the mirror 17 at varying angles and positions. The diverted beam thus moves in relation to the reflecting surface of the drum 18 giving a non-linear scanning path of the beam. The relative movement of the diverted beam may be eliminated by making the inner and outer drum surfaces parallel, resulting in a constant displacement only of the beam. This may be done either by making the cavity 14 hexagonal, that is, with walls parallel to the facets 16 (not shown), or by making the transmitting parts of the facets 16 parallel to the circular-sectioned cavity as shown in FIG. 2(a). If the source is circularly polarised, the beam may be arranged to strike the curved transmitting parts of the surface at the Brewster angle [B in FIG. 2(a)], when light losses due to reflection at the drum srufaces are virtually eliminated. If such reflection losses are reduced, it may be preferred to mount the mirror 17 outside the drum 13. FIG. 2(b) illustrates such an arrangement in which the beam is seen to pass twice through the wall of the drum. FIG. 2(c) shows an alternative arrangement in which the mirror 17 is mounted adjacent the drum 13. The beam is caused to diverge such that part of it strikes the mirror as well as the drum. This has the advantage of avoiding any losses caused by transmission of the beam through the material of the drum. The mirror 17 is not restricted in size or mounting arrangement. However, mounting of the mirror 17 away from the drum 13 may lead to a reduction in the useful scanned area caused by the two component scans not covering the same area. This reduction is not significant unless the object plane is very close to the scanning system, in which case a correction could be introduced by a tilt of the mirror 17.

If the system is to be used for continuously tracking a known object within the scanned area, then the object may have mounted thereon, highly reflecting surfaces arranged to concentrate the received illumination back towards the receiving apparatus. If the object is known to undergo small rotational movements about any axis other than the direction of propagation of the particular beam of interest, then the reflecting surfaces may be arranged into a "corner cube." So that the incident light is returned to a receiving apparatus near to the transmitter and not to the transmitter the reflected light must be defocussed either by lenses or by non-orthogonal surfaces on the "corner cube", or by diffuse reflectors.

The basic system thus far described is deficient in that the presence of more than one object gives rise to ambiguities in the measured positions. For example, in FIG. 3, there is shown two objects A and B and the instantaneous positions of beams scanning in the $x$-and $y$-direction and intercepted by the plane. The beam scanning in the $x$-direction detects two objects which lie somewhere on the lines $x1$ and $x2$. The beam scanning in the $y$-direction detects an object lying somewhere along the line $y1$ and an object lying somewhere along the line $y2$. As the intersection of the $x$ and $y$ scanning lines represents a detected object it will be seen that the two objects A and B could be at alternative positions C and D.

Figure 3:
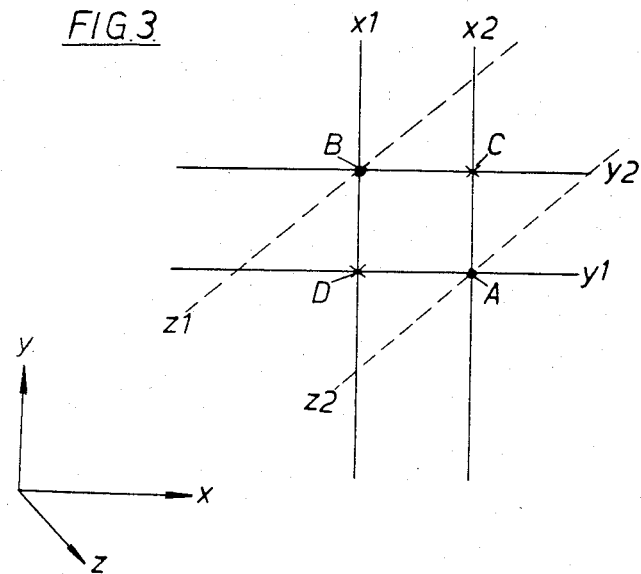
FIGS. 3 and 4 illustrate the forms of information given by the tracking system.

The ambiguity may be resolved in a number of ways: For a small number of objects a third scanning direction may be introduced at an angle to the other two, as shown in FIG. 3 by the broken line Z. The detection of the objects A and B by the lines $z1$ and $z2$ resolves the previous ambiguities.

Figure 4:
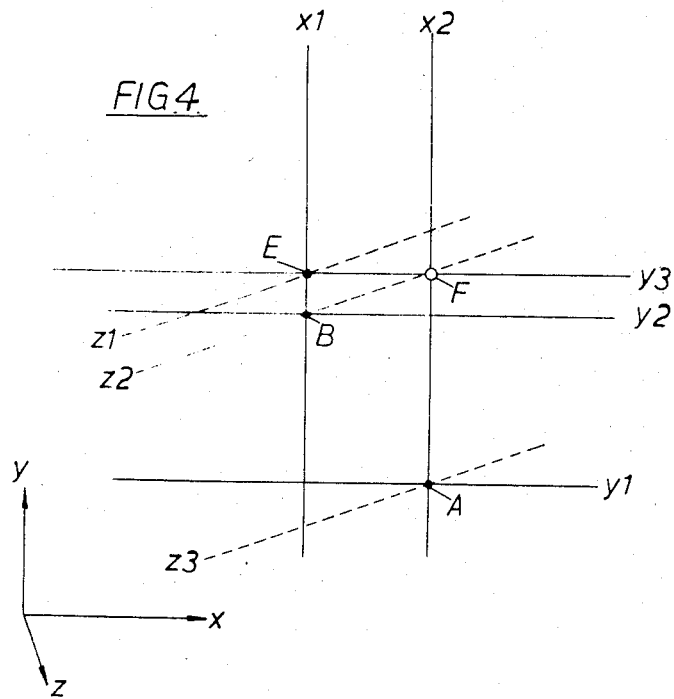

However, as the number of objects increases new ambiguities may arise. With reference to FIG. 4, if there is a third and a fourth object at E and F respectively, then under the $x$-followed-by-$y$ scanning arrangement the existence of one object at E or F is assured but it is indeterminate whether there are two. The addition of a z-direction scan resolves the existence of an object at E but the existence of an object at F is never certain because the z-scan also detects the object at B. Thus as the number of objects increases additional scanning directions have to be introduced to eliminate the possible ambiguities.

In general, if it is not known how many objects are in view or how their positions inter-relate, other methods of removing ambiguities may be considered.

The reflecting part of the object may be coded so that as the beams scan the object, a characteristic signal is reflected from the object for each beam. Such a code may comprise a plurality of contrasting stripes, the number of stripes and their width distinguishing between individual objects. The receiving system, however, requires a greater bandwidth to interpret the coded signals than to merely detect a signal.

Alternatively, multiple objects having known original positions may be distinguished by comparing the distance between successive positions of each object and pairing ambiguous points with predicted ones. If the paths of the objects cross, then the direction of the objects must be taken into account in the prediction.

The increasingly sophisticated means used in the above methods of distinguishing between multiple targets may be eliminated with advantage if the object is able to carry receiving apparatus. More instrumentation is required at the object but position identification of the object is accurate and aided by an increased signal strength.

One instance of where a strong signal is required and where the object is able to carry receiving apparatus is in the calibration of an instrument landing system for an aircraft. A so-called blind landing system, that is, one which is independent of the pilot's visibility, is dependent upon knowledge of height, position and the hazards between the aircraft and the runway. The height and position may be determined by standard instruments. On approach, the pilot determines his position and follows a predetermined descent path to the runway. The blind-landing system requires calibration upon installation and a periodic re-calibration to maintain the specified accuracy; such re-calibration also takes into account environmental changes below the flight path to ensure that it is still clear.

Figure 5:
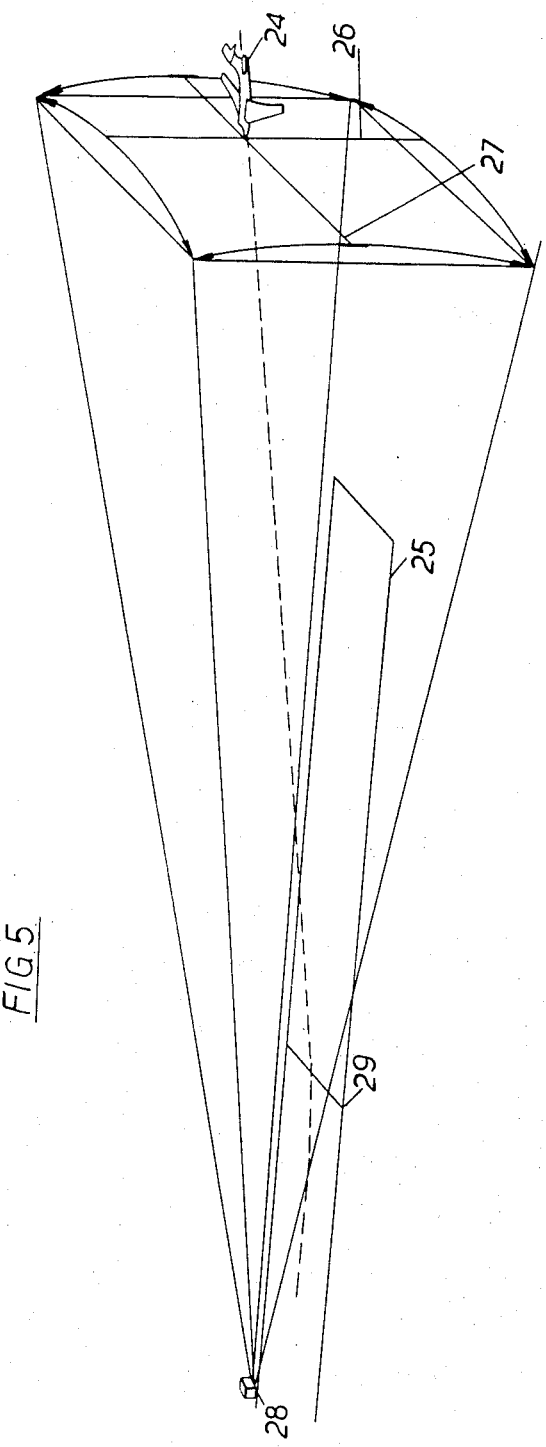
FIG. 5 shows an illustrative use of the tracking system.

This calibration may be conveniently achieved by flying an aircraft 24 having the receiving equipment installed, along a predetermined approach to the runway 25 in conditions of good visibility and checking the equipment readings against an external determination of the position. FIG. 5 shows an arrangement in which a laser beam is split producing line images 26, 27 in two orthogonal directions, each image scanning over the approach path from a position 28 near to the touchdown point 29.

The scanning is performed by a rotating drum arrangement similar to that of FIG. 1, but in which the beams are modulated proportionally to their angle of scan, the detected light signals, when demodulated, giving an accurate position of the aircraft with respect to the source. The scanned area is not required to extend widely beyond the direct line of approach, the angle of scan being correspondingly small, say ±3°. A nultifaceted drum as in the arrangement of FIG. 1 would be required to have 120 facets; and, because of the necessity to accomodate the emergent beam giving a minimum allowable facet size, a 120 facet drum would be impracticably large. Also, modulation of the beam, which has to be done for each facet, is difficult with so many facets.

Figure 6:
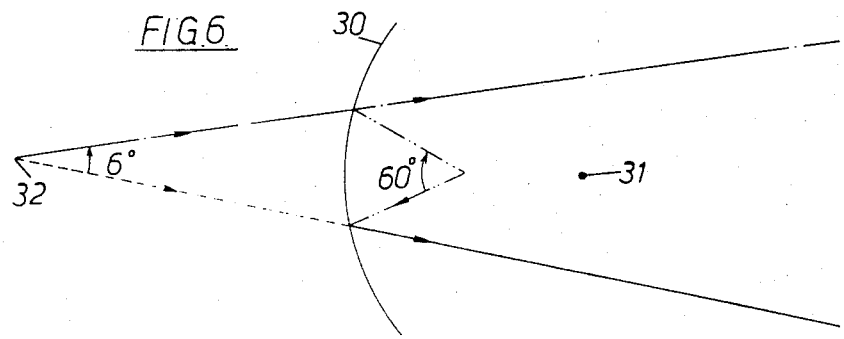
FIG. 6 shows the principle of operation of a modified form of the arrangement of FIG. 1 applied to the system of FIG. 5, and FIGS. 7(a) and 7(b) are elevation and plan views respectively of alternative forms of the modified arrangement used in FIG. 5.

FIG. 6 illustrates the principle by which a scanning system using a small number of drum facets may be used, the angle of scan being kept small by the use of a cylindrical mirror 30. The figure shows how a beam divergent in a plane normal to the plane of the figure and scanned over an angle of, say, 60° between the solid and chain lines from a point between the curved surface and its focal point 31 is reflected as an apparent source 32 having a 6° scan angle (shown by broken lines) behind the surface. It is therefore possible to employ a six-facet drum having a scan angle of 60° similar to that in the FIG. 1 to give an effective scan angle of ±3° from the centre of the approach path.

Figure 7A:
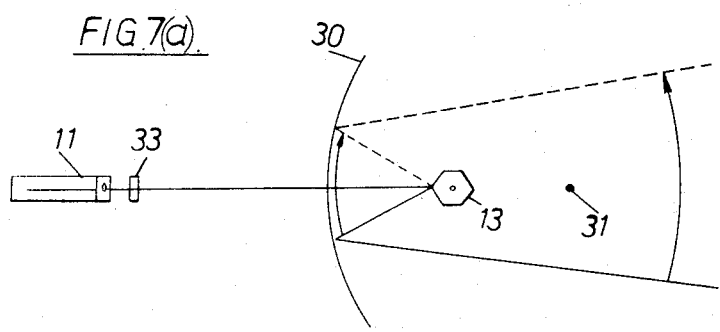
Figure 7B:
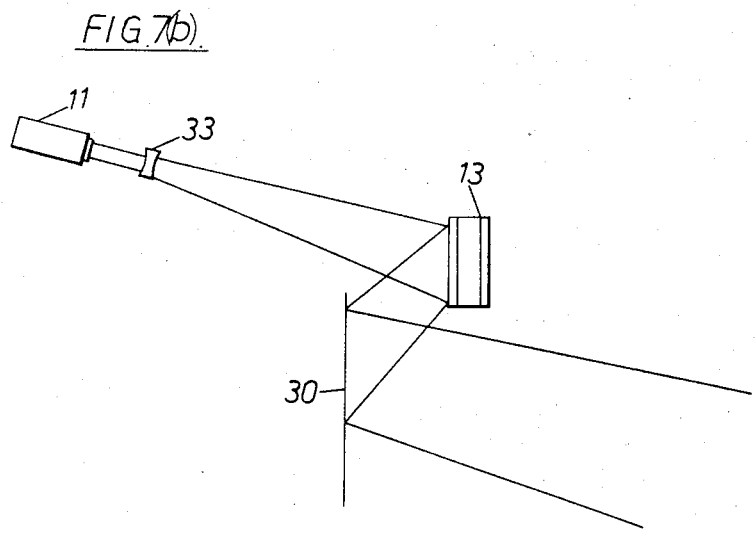

FIGS. 7(a) and 7(b) are elevation and plan views respectively of an arrangement employing the principle of FIG. 6 but with the light source mounted in an alternative position behind the surface of the mirror 30.

A cylindrical concave lens 33 produces sufficient divergence of the beam to be used instead of the mirror 12 of FIG. 1. Only means for producing a single line image are shown, that is, the drum 13 and the mirror 30; a plane mirror (17) in the drum 13 and a second drum (18), similar to those of FIG. 1 are employed to provide the orthogonal image.

Receiving apparatus employed in the above systems may be sensitive to, and become saturated by, light not originating in the laser, for example, daylight; but as the laser output is restricted to a very narrow range of frequencies, the receiver may be provided with a narrow-band filter to discriminate against such extraneous light sources.

Matching of the operating frequencies of the laser transmitter and receiving apparatus may be used to provide different frequencies for the light in each direction so that the two independent scans may be carried out simultaneously. To achieve this, it is necessary to arrange for the complete facets on the drum 13 to be half-silvered, that is, semitransparent.

What I claim is:

1. Apparatus for tracking an object within a plane area in space comprising a source of optical radiation, an optical system arranged to form the radiation from the source into a flat beam, movable reflector means including at least two multifaceted drums rotatable in synchronism with each other about their longitudinal axes, the axes being inclined at a finite angle to each other, a first of said drums being at least partly reflective of the radiation and so disposed in the path of the beam from the optical system that a part of the beam is reflected from the drum towards said plane area and scans over the area, as the drum rotates, in a direction transversely to the direction of greatest divergence of the beam at the plane, beam diverting means for diverting the part of the beam not reflected by the first drum towards the second drum, said second drum being so located as to reflect radiation incident thereon towards said plane area and to cause the beam to scan over the area transversely to the direction of greatest divergence of the beam at the plane, and a receiver system responsive to the irradiation of the object by the scanning beams and to the relationship between the time into the scan that the object is crossed by the beam reflected by the first drum and the time into the scan that the object is crossed by the beam reflected by the second drum to determine the position of the object in said plane.

2. Apparatus as claimed in claim 1 in which the source of radiation is a laser.

3. Apparatus as claimed in claim 1 in which the optical system comprises a cylindrical reflective surface in the path of the beam.

4. Apparatus as claimed in claim 1 in which the optical system comprises a cylindrical lens.

5. Apparatus as claimed in claim 1 in which the receiver of the optical radiation is remote from said plane area and is adapted to receive radiation reflected from an object in the plane area.

6. Apparatus as claimed in in claim 1 in which each facet of said first drum is partly reflective and partly transmissive of the optical radiation.

7. Apparatus as claimed in claim 6 in which a predetermined portion of each facet is fully reflective of the optical radiation and the remainder of each facet is fully transmissive of the optical radiation.

8. Apparatus as claimed in claim 7 in which the boundary between said fully reflective and said fully transmissive portions of each facet extends parallel to the longitudinal axis of the drum for the length of the facet.

9. Apparatus as claimed in claim 1 in which said first drum is hollow and contains on its axis of rotation the beam diverting means.

10. Apparatus as claimed in claim 1 in which the beam diverting means comprises a plane mirror inclined to the axis of rotation of the first drum at an angle intermediate said finite angle between the axes of rotation of the first and second drums.

11. Apparatus as claimed in claim 1 in which the axes of rotation of the first and second drums are in a plane parallel to the plane of said area.

* * * * *